Sept. 12, 1967     T. P. VASILJEVIC     3,340,642

FISHING SPEAR GUN WITH DUAL SPEAR PROJECTING MEANS

Filed Aug. 17, 1964     5 Sheets-Sheet 1

INVENTOR.
TOMISLAV P. VASILJEVIC

BY

ATTORNEYS

Sept. 12, 1967  T. P. VASILJEVIC  3,340,642

FISHING SPEAR GUN WITH DUAL SPEAR PROJECTING MEANS

Filed Aug. 17, 1964  5 Sheets-Sheet 4

INVENTOR.
TOMISLAV P. VASILJEVIC

BY

ATTORNEYS

United States Patent Office 3,340,642
Patented Sept. 12, 1967

3,340,642
FISHING SPEAR GUN WITH DUAL SPEAR PROJECTING MEANS
Tomislav P. Vasiljevic, 2700 McRae Road,
Anchorage, Alaska 99503
Filed Aug. 17, 1964, Ser. No. 390,051
10 Claims. (Cl. 43—6)

This invention pertains to a spear gun especially adapted for underwater fishing.

The spear gun of this invention is devised to provide a high velocity projectile, while at the same time being readily and conveniently used by the fisherman. The gun includes an elongated barrel into which is inserted the spear that engages a slider which is latched in a retracted position by a trigger assembly. A duality of coil springs in the barrel provides a propelling force for the slider, while external strands of rubber under tension likewise impart a driving force to this element. Hence, the slider that propels the spear from the barrel is both pushed and pulled through its stroke. The spear includes a removable point that carries barbs which can expand upon entry into the fish, being held in a contracted position by means of a collar that slides out of the way to release the barbs as the body of the fish is penetrated. Various points may be used on the spear to suit conditions encountered, and the device may be constructed to inject poison into the fish upon entry into the fish.

An object of this invention is to provide an improved fishing spear gun which drives the projectile at great velocity.

Another object of this invention is to provide a spear gun that drives the spear through both spring force and the contraction of resilient strands.

A further object of this invention is to provide a spear gun that is readily and conveniently loaded and used.

Yet another object of this invention is to provide a spear gun in which both a pulling and a pushing force are employed in discharging the projectile.

A still further object of this invention is to provide a spear gun which is capable of automatically ejecting poison upon contact with the target.

An additional object of this invention is to provide a spear gun with readily detachable and replaceable points for the spear.

These and other objects will become apparent from the following detailed description taken in connection with the accompanying drawings in which.

Figures 1, 14, 15, 17:
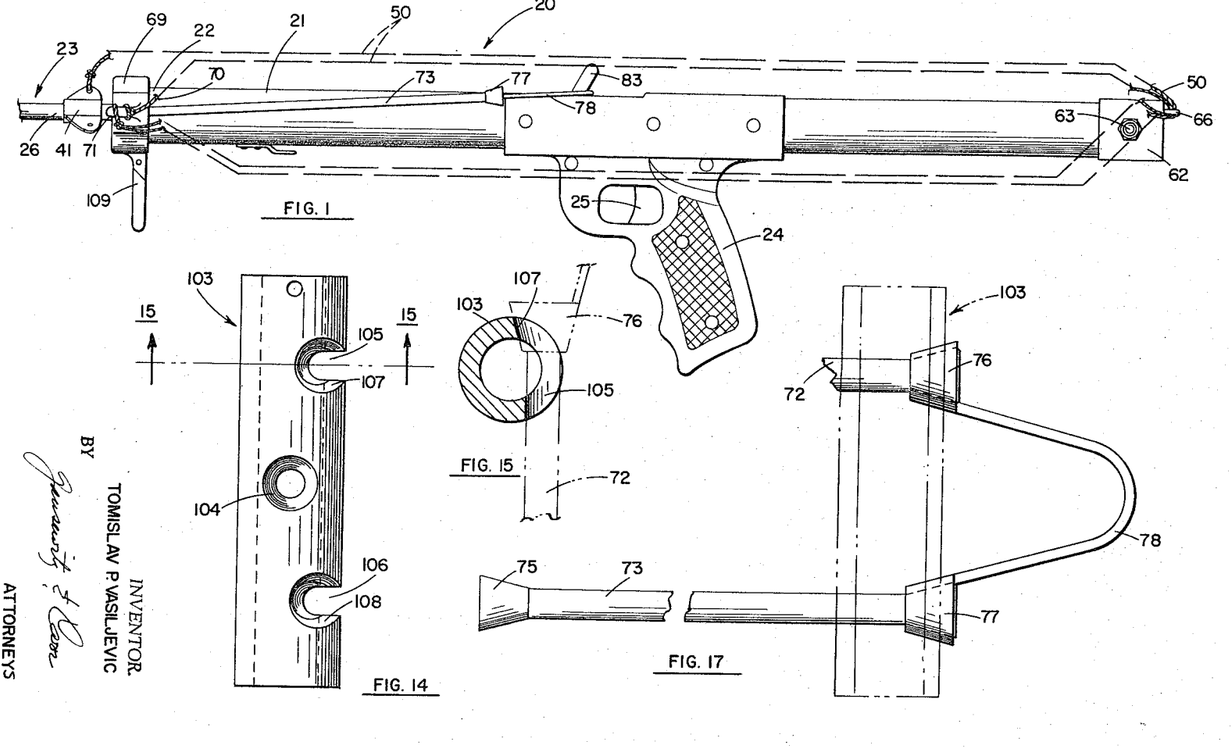
FIGURE 1 is a side elevational view of the spear gun arrangement of this invention.
FIGURE 14 is an elevational view of the device for loading the gun.
FIGURE 15 is a transverse sectional view taken along line 15—15 of FIGURE 14.
FIGURE 17 is a fragmentary plan view showing how the loading device is utilized in applying tension to the resilient strands for propelling the spear.

With reference to the drawing, the spear gun 20 includes a hollow slotted barrel 21 that is adapted to receive at its muzzle end 22 the shank of a spear 23. A handle 24 depends from the barrel intermediate its ends, and carries a trigger 25. Upon actuation of the trigger, the spear 23 is driven outwardly toward the target selected.

Figures 2, 3, 4, 5, 6, 7, 8:
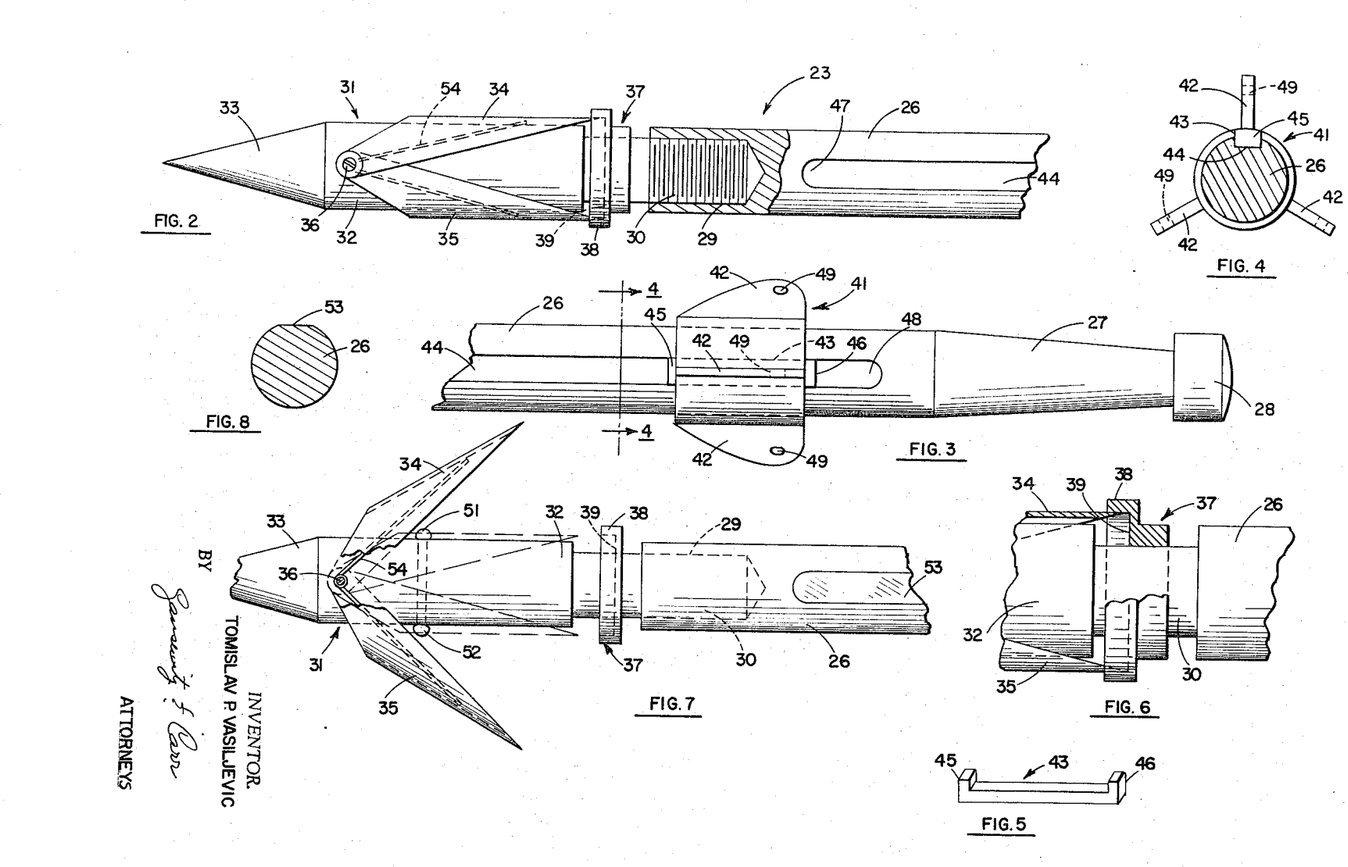
FIGURE 2 is an enlarged fragmentary plan view, partially in section, of the forward portion of the spear assembly of this invention with the barbs retracted.
FIGURE 3 is an enlarged fragmentary plan view of the rearward portion of the spear assembly.
FIGURE 4 is a transverse sectional view taken along line 4—4 of FIGURE 3.
FIGURE 5 is a perspective view of the retaining clip that holds the collar on the exterior of the spear rod.
FIGURE 6 is an enlarged plan view, partially broken away, showing the manner in which the barbs are held in their retracted position.
FIGURE 7 is a view generally similar to FIGURE 2 but with the barbs in their alternate opened position.
FIGURE 8 is a transverse sectional view illustrating an arrangement for the spear rod utilizing a flat area instead of a groove for holding the slidable collar.

The spear assembly 23, as may be seen in FIGURES 2, 3 and the related views, is made up of an elongated rod 26 of substantially uniform diameter throughout the major portion of its length. At the inner end where the rod 26 is inserted into the barrel of the gun it tapers in a frusto-conical configuration at section 27, terminating in a short cylindrical portion 28 at the end. The opposite end of rod 26 includes an axially extending threaded opening 29 which receives the threaded end of a short cylindrical post 30 extending from the point assembly 31. In this manner, it is possible to attach different points as desired to the spear rod 26, or to remove the rod from the point after it has entered a fish.

The point assembly 31 includes a cylindrical section 32 that is larger than the extension post 30, and which joins conical end 33. A duality of barbs or flukes 34 and 35 pivotally connects to the section 32 of the point assembly 31 by means of diametrically extending pin 36 at the forward portion of the section 32. The barbs 34 and 35 are rounded transversely so that they can lie closely adjacent the cylindrical section 32 when retracted, as illustrated in FIGURE 2. They are retained in the retracted position by means of a collar 37 that is slidable along the extension 30 between the end of spear rod 26 and the point section 32. The enlarged forward portion 38 of the collar 37 includes an axially extending recess 39 adapted to receive the tips of the barbs 34 and 35. Hence, with the collar 37 in its forward position with the barbs 34 and 35 in the recess 39, as illustrated in FIGURES 2 and 6, the barbs cannot pivot outwardly about the cross pin 36.

An additional collar 41, which includes radially outwardly extending fins 42, is slidably received on the spear rod 26. A U-shaped clip 43 fits within a groove 44 that extends axially substantially the entire length of the spear rod 26, and holds the collar 41 to the spear rod 26. The end legs 45 and 46 are positioned at either end of the collar 41 so that the clip is held to the collar. The axial travel of the clip 43 is limited by the ends 47 and 48 of the groove 44 in the rod 26. At least one of the vanes 42 of the collar 41 includes an aperture 49 to provide an attachment for a cord. The cord will be secured to the gun 20 so that the spear 23 will not be lost when the gun is fired.

When the end 28 of the spear rod 26 is inserted into the gun's barrel 21, the collar 41 will be slid along the rod 26 to a position adjacent the forward end 47 of the groove 44. Also, the barbs 34 and 35 will be retracted inwardly and held by the collar 37, which is moved to its forward position adjacent the cylindrical portion 32 of the point assembly 31. When the spear is driven out of the gun barrel 21, the collar 41 will slide rearwardly along the rod 26 toward the end 48 of the groove 44, and at that point will carry with it the cord 50 attached through the opening 49.

When the spear strikes its target so that the point 31 enters a fish, the collar 37 is moved rearwardly relative to the point assembly by the resistance afforded by the body of the fish. Consequently, the barbs 34 and 35 are released and free to move outwardly. They may be urged in an outward direction by small resilient pads of rubber 51 and 52 which bear against the inner surfaces of the barbs 34 and 35. Therefore, any subsequent small axial movement of the spear 23 away from the fish, occasioned for example by a pull on the cord 50, causes the barbs to pivot outwardly, as indicated in FIGURE 7. The barbs 34 and 35 will become firmly embedded in the fish and prevent further withdrawal of the spear.

Some variations are possible in the construction of the spear assembly. For example, instead of the resilient pads 51 and 52, the outer ends of the barbs 34 and 35 may be inclined away from the point body 32 to cause them to catch in the fish and open up without the use of the pads.

Also, instead of the resilient pads 51 and 52, the barbs may be pivoted to the open position by spring force. This may be accomplished through the provision of a torsion spring 54 that circumscribes pin 36 and has end legs extending outwardly to engage the inside surfaces of the barbs 34 and 35 to bias them toward the position of FIGURE 7. While the spring will open the barbs upon entry into a fish and release by the collar 37, hand pressure will readily close the barbs to the position of FIGURE 2. While both the torsion spring 54 and resilient pads 51 and 52 are illustrated on one point, it should be understood that normally these are alternatives and not used together.

Instead of the groove 44 recessed in the circumference of the rod 26, it may alternatively include only a flat portion 53, as shown in FIGURE 8. The inner edge of the clip 43 will ride against the flat surface 53, and again the travel of the collar 41 will be limited by the length of the flat section.

Figures 9, 10, 11:
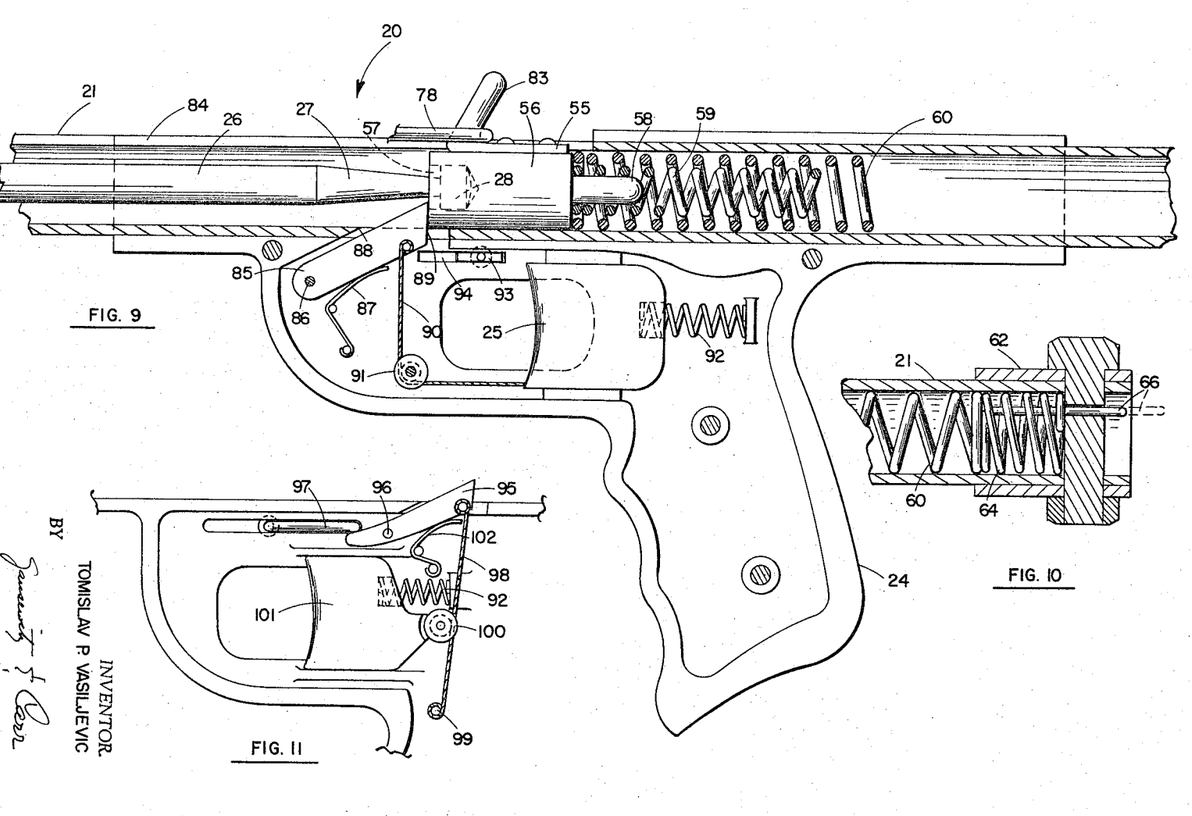
FIGURE 9 is an enlarged longitudinal sectional view showing the slider for propelling the spear, the driving springs and the trigger-release arrangement.
FIGURE 10 is a fragmentary longitudinal sectional view of the rear portion of the gun barrel illustrating the arrangement of the springs in that area.
FIGURE 11 is an elevational view of an alternate trigger mechanism.

A slide 55 is received in the barrel 21 and used to drive the spear 23. The slide includes a cylindrical portion 56 dimensioned to freely move axially within the barrel. A recess 57 in the outer end of the portion 56 of the slide 55 is adapted to receive the end 28 of the spear rod 26. Thus, when the spear rod is inserted into the barrel through the opening 54 at the muzzle, its end is received within the aperture 57 and in engagement with the slide 55 at that location.

A short pin 58 projects axially from the opposite end of the slide 55 and is received within one end of an elongated compression spring 59. A second compression spring 60 is located in the barrel, circumscribing the spring 59. The two springs 59 and 60 are oppositely wound. These springs supply a portion of the force for moving slider 55 to thereby provide impetus to the spear 23.

The inner end of the barrel 21 beyond the handle 24 is received within a short sleeve 62, through which extends a bolt 63. The end of the inner spring 59 bears against the bolt 63, which positions that end of the spring 59. The larger spring 60 terminates at the end of a shorter spring 64 of the same diameter as the spring 60. The spring 64, in turn, bears against bolt 63. The inner end of the spring 64 is bent to extend longitudinally back through that spring, providing a pin 66 passing through an opening in the bolt 63 toward the end of the barrel 21.

When the spear 23 is inserted into the barrel 21, thereby through the slide 55 compressing the springs 59 and 60, the small spring 64 likewise will be compressed. This will cause the end of the pin 66 to extend outwardly beyond the barrel, as indicated in phantom in FIGURE 10. This is used as a location to hook the cord 50 that is attached through the opening 49 in the vane 42 of the collar 41 on the shank of the spear rod 26. While one end of the cord 67 attaches to the collar 41, the opposite end fits through an opening 68 in the transverse bracket 69 located at the muzzle of the gun. Hence, there is a doubled-over length of cord 50 that extends from the collar 41 and the bracket 69 rearwardly around the pin 66 and returns forwardly to the bracket 69. A short rubber strand 70 is secured to the midportion of the cord 50 and hooks around projection 71 on the bracket 69. In this manner a considerable length of cord is retained when the spear is mounted within the gun, with the cord being kept free from tangling or fouling as the gun is carried.

Upon discharge of the spear, the compression force on the springs 59, 60 and 64 is released so that these springs return to an expanded position, as indicated in solid lines in FIGURE 10. When this occurs, the pin portion 66 of the spring 64 is drawn inwardly of the end of the barrel. Consequently, the portion of the cord 50 looped around the pin 66 is released as soon as the spear is discharged. Thus, the cord 50 is held securely out of the way when the spear is thrust within the barrel 21, yet the cord is released automatically to follow the spear as soon as the spear is driven out of the barrel.

Figure 12:
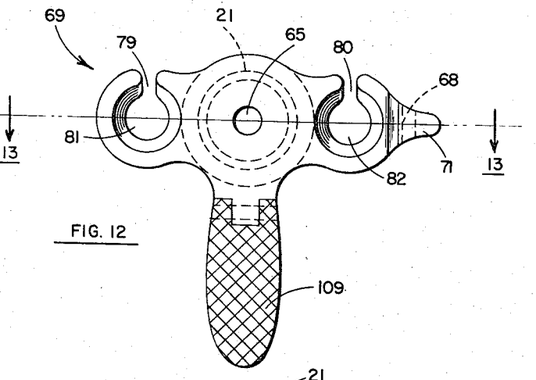
FIGURE 12 is an end elevational view of the nozzle of the gun and the transverse bracket at that location.

Additional propelling force is imparted to the spear 23 through heavy stretched resilient strands 72 and 73, preferably made of rubber. These members are provided with enlarged frusto-conical elements 74 and 75 at one end and generally similar fittings 76 and 77 at the opposite end. The latter pair of fittings is interconnected by a short length of metal 78. The transverse bracket 69 on the gun barrel includes slots 79 and 80 that communicate with openings 81 and 82, which generally are complementary to the ends 74 and 75. Thus, the resilient strands 72 and 73 are readily secured to the bracket 69 of the gun, and, when the strands are inserted through the openings 79 and 80, their end fittings 74 and 75 will be retained by the walls of the openings 81 and 82. The strands are stretched so that the length of metal 78 fits behind a hook 83 carried by the slide 55. The barrel 21 is provided with an axially extending slot 84 to permit the hook 83 to project outwardly of the barrel without interfering with the travel of the slide 55.

It can be seen, therefore, that the slide 55 which drives the spear 23 is both pushed by the springs 59, 60 and 64, and pulled by the rubber strands 72 and 73. Hence, a great deal of driving force is provided for moving the slide 55 and propelling the spear 23.

The trigger mechanism, best illustrated in FIGURE 9, includes a short detent link 85 pivotally mounted on the gun by means of pin 86 and inclined rearwardly with respect to the muzzle 22. A leaf spring 87 biases the link 85 upwardly through a slot 88 in the gun barrel into the bore of the gun. In this position, the end wall 89 of the link 85 can engage the forward edge of the cylindrical body 56 of the slide 55, preventing forward movement of the slide. The frustoconical section 27 of spear rod 26 provides clearance for the detent 85 so that it can move into engagement with the forward end of the slide.

Thus, upon loading the gun the slide 55 is moved to the rear and its rearward edge will react against the link 85, pushing this link downwardly through slot 88 to permit the slide 55 to pass the link 85. As soon as this occurs, spring 87 causes the link 85 to rise up where it engages the forward edge of the slide body 56 and prevents outward movement of the slide. The member 85 thereby acts as a detent to hold the slide 55 against outward movement.

A short cable 90 is attached to the upper portion of the link 85 and extends around a pulley 91 to the slidable trigger 25. The latter element is biased forwardly, or to the left as illustrated in FIGURE 9, by means of a leaf spring 87 and pulled rearward by tension spring 92. It can be seen, therefore, that in order to discharge the spear 23 it is necessary simply to pull the trigger 25, moving it to the right in FIGURE 9, so that through cable 90 it pulls the link 85 downwardly through the slot 88 in the barrel of the gun. The slide 55 then is released.

A safety catch is provided to prevent inadvertent discharge of the spear, this being a slidable member 93 movable in slot 94 and operable from the exterior of the gun. The slide element 93 can be moved to a position beneath the detent 85, which will prevent downward pivotal movement of that link. Consequently, the slide cannot be released because of the prevention of movement of the element 85 that retains the slide.

An alternate trigger arrangement operating on generally the same principle is illustrated in FIGURE 11. Here the slide 55 is retained by a detent link 95 pivotally mounted on a pin 96. The opposite end of the link 95 extends beyond the pin 96, and safety slide 97 may be positioned above it to prevent pivotal movement of the member 95. Cable 98 is fastened at one end to a pin 99 and bears against a pulley 100 on a trigger 101. When the safety 97 is in the released position, the trigger 101 may be pulled to the right, thereby causing pulley 100 to bend the cable 98 and pull downwardly on the link 95 to release the slide 55. Subsequently, leaf spring 102 returns both the link 95 and the trigger 101 to the original position.

Upon discharge of the spear, and the resulting expansion of springs 59, 60 and 64, the springs extend past slot 88 and hold the link 85 (or link 95 of the alternate construction) downward out of the barrel. The link 85 or 95 can again rise upwardly into the barrel when the gun is reloaded as a result of the force from the leaf spring engaging the detent link. The spring 92 takes the slack out of the cable 90 or 98, and holds the trigger 25 or 101 in the right position.

When the trigger releases the slide 55, the slide is driven violently toward the muzzle 22 (to the left as illustrated) by the combined force of the two springs 59 and 60 and the strands 72 and 73. Extremely rapid acceleration is achieved by the sizable pulling and pushing force on the slider 55. The slide 55, which is larger than the muzzle opening 54, travels only to the muzzle of the gun, where it strikes against the wall of the bracket 69, which acts as a stop and limits its travel. The spear, however, continues onwardly as the potential energy from the springs and stretched rubber strands is converted to dynamic energy, propelling the spear at high velocity. As the spear moves, the vanes 42 stabilize it and keep it on a direct path toward the target.

An important aspect in using any spear gun is the loading of the gun. It must be possible to load the gun easily and with safety or the gun's value is impaired seriously. With the present invention, loading is accomplished quite readily by the unit 103 illustrated in FIGURES 12, 13, 14 and 15. The member 103 is tubular and may be formed from a length of pipe. It includes a tapering radial opening 104 at its midportion and a duality of slots 105 and 106 on one side. On one edge these slots have inclined walls 107 and 108.

Figures 13, 16:
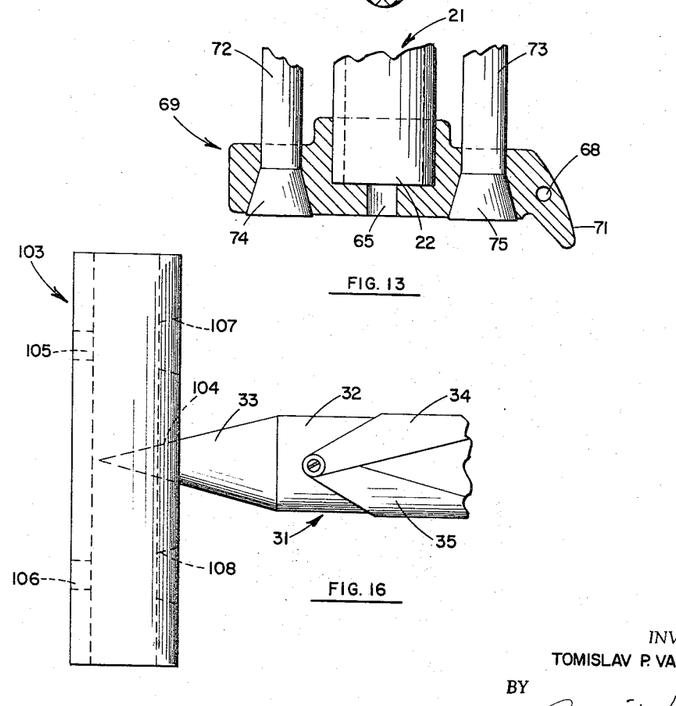
FIGURE 13 is a sectional view of the muzzle and bracket taken along line 13—13 of FIGURE 12.
FIGURE 16 is a fragmentary plan view illustrating the loading device as used to push the spear into the muzzle of the gun.

The member 103 provides a dual function, serving first to press the spear into the barrel against the resistance of the springs 59 and 60, and, secondly, to apply tension to the rubber strands 72 and 73. In forcing the spear into the barrel, the point 33 of the spear is inserted into the opening 104 of the member 103. This covers the sharp end of the point so that moving the spear into the barrel to the cocked position becomes a safe operation. The member 103 provides a readily grasped member for pushing against the spear to cause the spear to enter the gun. Of course, as the spear passes into the muzzle of the gun, it fits within the recess 57 in the slide 55, moving the slide backwardly until the trigger link 85 is passed, which retains the slide in the retracted position with the springs 59, 60 and 64 compressed.

Then the member 103 is removed from the spear point, and the frusto-conical fittings 76 and 77 of the strands 72 and 73 are inserted into the slots 105 and 106. The tapering walls of the fittings 76 and 77 complementarily engage the surfaces 107 and 108 of the slots 105 and 106. The member 103 then is moved rearwardly, simultaneously stretching the two strands 72 and 73. It is pulled back until the length of metal 78 can fit behind the hook 83 of the slide 55, thereby attaching the strands to the slide. A foldable handle 109 is included with the bracket 69 and can be pressed against by the foot when the member 103 is being used to stretch the rubber strands 72 and 73.

In some instances it may be desired to poison the fish at the time it is shot with the spear. This, too, can be accomplished by the arrangement of this invention through the construction illustrated in FIGURES 18, 19, 20, 21 and 22. For this purpose, there is provided a special spear point assembly 110 having a threaded opening 111 adapted for connection with the end of a spear shank. The opening 111 is formed in an end fitting 112 of the point assembly, which in turn is connected to the central body portion 113 of the spear unit 110. At the opposite end of the central portion 113 is a removable point 114 adjacent which project several short barbs 115.

Figure 18:
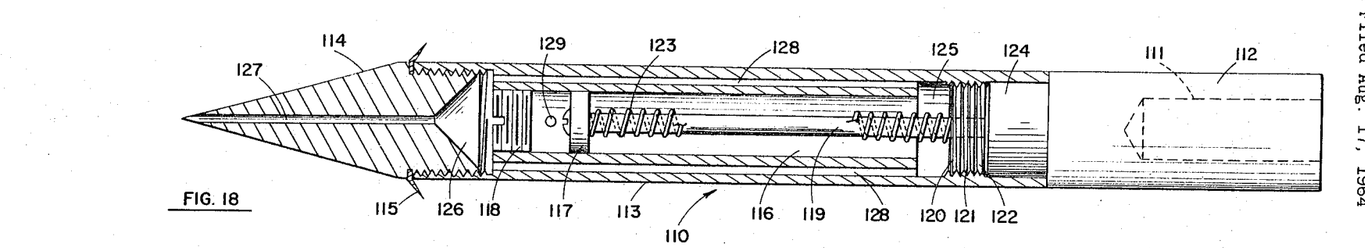
FIGURE 18 is a longitudinal sectional view of a modified spear in which the point distributes poison.
Figures 19, 21:
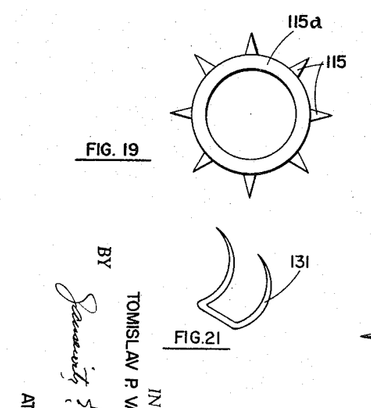
FIGURE 19 is an end elevational view of the forward portion of the point assembly of FIGURE 18 separated from the remainder of the point assembly.
FIGURE 21 is a perspective view of one of the barbs for the point of FIGURE 20.

These barbs are made of sheet metal, extending from an annular support 115a. The latter element fits around the threaded shank of the point, 114, so that when the point is threaded into the end of the body 113, the barbs are secured between the members 113 and 114.

The body portion 113 of the point unit 110 is hollow, defining a cylindrical reservoir 116 adapted to receive a quantity of liquid poison. A disc 117, which may be constructed of cork, is axially slidable in the cylindrical chamber 116. A plug 118 acts as a cylinder head at the outer end of the chamber 116. A rod 119 projects to the right from the disc 117, slidably passing through aligned axial openings in three washers 120, 121 and 122, the exteriors of which are threadably received in the end of the body portion 113. If desired, a spring 123 may be included around the periphery of the rod 119.

The rod 119 is an integral part of the end fitting 112 that connects to the spear shank. The rod 119 joins the member 112 at a short cylindrical section 124 of reduced diameter immediately beyond the threaded section of the member 112. The portion 124 fits snugly within the end portion of the body 113 beyond the washers 120, 121 and 122, providing proper alignment and a strong connection between the members 112 and 113.

When the gun is discharged and the point enters the fish, it is embedded by virtue of the barbs 115 adjacent the point 114. At this time, the spear is pulled outwardly manually, which exerts an axial force on the member 112, urging it to the right as the unit is illustrated in FIGURE 18. This causes the piston 117 to slide to the right as it is moved in this direction by the rod 119 that forms a portion of the assembly 112. As this occurs, the rod 119 slides through the apertures in the washers 120, 121 and 122. The movement of the piston to the right forces the poison carried in the reservoir 116 into the end chamber 125 and thence backwardly in the reverse direction through the longitudinal passages 128. Cavitation in back of the piston 117 is prevented by opening 129 so that the piston is allowed to slide freely. The poison discharges from the passages 128 into the hollow section 126 at the inner end of the point 114, from which it is forced outwardly into the fish through the axial opening 127 that extends to the tip of point 114. The small barbs 115 hold the body 113 in the fish until the piston reaches the end of its stroke adjacent the washer 120. Hence, virtually all the poison retained in the reservoir 116 is exhausted from it and forced into the fish. Then, continued pulling on the spear assembly causes removal of the body 113 and the point 114 from the fish with the injection of poison into the fish then complete.

Figure 20:
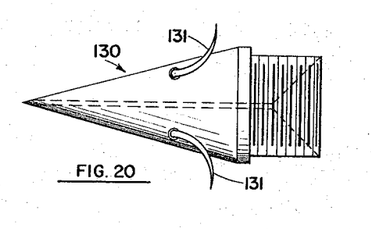
FIGURE 20 is a plan view of a modified poison-ejecting point end having pivotal barbs.

An optional form of removable point 130 is seen in FIGURE 20 and may be screwed into the end of body section 113 to replace the point 114 if desired. The point 130 is identical to the point 114 in most respects, but has a different barb arrangement. Instead of the radial projections 115, there are provided two U-shaped members 131, one of which is illustrated in perspective in FIGURE 21. The members 131 are extended through small openings in the conical portion of the point 130 and project outwardly to become embedded in the fish once the spear point enters.

Figure 22:
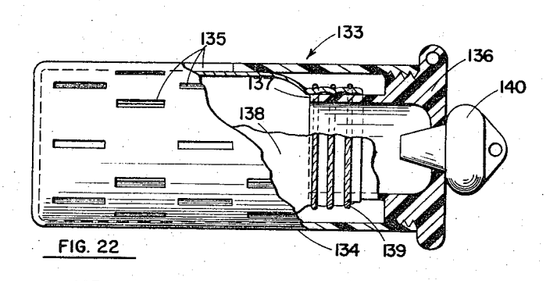
FIGURE 22 is a plan view, partially broken away, of a bottle for supplying additional poison for use in the point assembly of FIGURE 18.

In order to replenish the poison supply while utilizing the assembly 110, a bottle 133 may be provided to retain an additional quantity of poison. The bottle 133 includes an outer shell 134 having slots 135 through its periphery to allow the entry of water. At the outer end is a cap 136 threaded into the shell 134 and with an inwardly extending cylindrical portion 137. A flexible bag, or balloon, 138 fits over the neck defined by the cylindrical portion 137, where it is held by spring element 139 or other retainer. A stopper 140 of soft material fits through an opening in the end element 136. This seals the content of the unit and the poison which is held within the bag 138. The bag 138 is free to collapse as the poison is used up, even while under water, because of the slots 135 through the periphery of the shell 134. Hence in the course of a dive the points 110 may be replenished with their poison supply. The latter is accomplished by removing the stopper 140 and inserting the point 114 into the opening in the bottle. Then the spear shank is pressed toward the point, returning the piston 117 to its original position which creates a vacuum that draws the poison inwardly through the point and into the reservoir 116.

Figure 23:
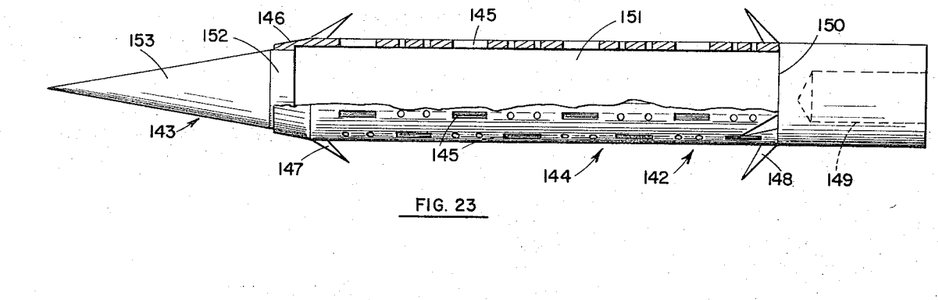
FIGURE 23 is a plan view, partially broken away, of an adaptor for permitting the fish to bleed once the point has been embedded therein.

The arrangement of FIGURE 23 is used in accelerating the bleeding of the fish after the spear has entered. This is accomplished by an assembly 142 attached to the spear shank, this assembly including a point and support member 143 over which is a sleeve 144. The sleeve is of cylindrical construction and provided with a plurality of apertures 145 so that its wall is slotted. The forward end 146 of the sleeve is tapered inwardly along the exterior surface. Adjacent the end 146 there are small barbs 147 projecting outwardly and inclined to the rear, while similar barbs 148 inclined forwardly are located near the opposite end of the sleeve 144.

The unit 143 includes a threaded opening 149 at one end, adapted for connection to the shank of the spear, or other suitable connecting arrangement may be provided as desired. Forward of this portion is the shoulder 150 engaged by the inner end of the sleeve 144, beyond which extends an elongated cylindrical shank 151. At the end of the shank is a short section 152 of reduced cylindrical diameter, beyond which is the pointed tip 153.

When the unit of FIGURE 23 enters the fish, the sleeve 144 becomes embedded because of the barbs 147 and 148 that project from its periphery. The spear then is pulled outwardly, sliding the point assembly 143 out from within the sleeve 144. This leaves only the sleeve remaining within the fish. Of course, the sleeve defines a central opening that communicates with the exterior of the wound in the fish. The openings 145 provide access to the center of the sleeve so that the fish will bleed rapidly through these slots and out through the sleeve. Hence, accelerated bleeding of the fish is accomplished through the large open wound that the arrangement of FIGURE 23 provides.

The foregoing detailed description is to be clearly understood as given by way of illustration and example only, the spirit and scope of this invention being limited solely by the appended claims.

I claim:
1. A fishing spear gun comprising
an elongated barrel,
a slider in said barrel,
    said slider being movable from a retracted position intermediate the ends of said barrel to an extended position adjacent one end of said barrel,
    said barrel at said one end being adapted to receive the shank of a spear to be discharged therefrom,
    said slider having an outer end adapted for engagement with such a shank of a spear,
trigger means for releasably latching said slider in said retracted position,
compression spring means in said barrel inwardly of said retracted position engaging the opposite end of
said slider for exerting a force on said slider tending to push said slider toward said one end of said barrel,
    said slider having hook means thereon,
    said barrel having an elongated slot through the wall thereof extending from the location of said retracted position to said one end,
        said hook means of said slider extending outwardly through said slot,
and a resilient elastomer member engaging said hook means and tending to pull said slider to said one end,
    whereby when said slider is released by said trigger means said slider is moved to said one end by said compression spring means and said resilient elastomeric member and discharges a spear engaged thereby from said one end of said barrel.

2. A device as recited in claim 1 in which
said elastomeric member includes a duality of strands of rubber,
    said strands being interconnected at one end and engaging said hook means at said one end,
    the opposite ends of said strands being connected to said barrel exteriorly thereof at said one end of said barrel.

3. A device as recited in claim 2 in which
said opposite ends of said strands include enlarged elements thereon,
and for said attachment to said barrel there is provided a member having slots therein,
    said slots being dimensioned to permit said strands to pass therethrough and being smaller than said enlarged elements,
        whereby said strands can be attached to said member by being passed through said slots with said enlarged elements being prevented from being pulled through said slots in response to tension forces in said strands.

4. A device as recited in claim 1 in which said trigger means includes
a detent pivotally carried by said barrel,
    said detent being movable between an upper position
        in which it is projecting into the interior of said barrel and inclined away from said one end of said barrel for engaging said one end of said slider and retaining said slider in said retracted position
    and a lower position
        outwardly of said barrel and remote from said slider,
resilient means urging said detent to said upper position,
and manually operable means for moving said detent to said lower position for thereby releasing said slider.

5. A fishing spear gun comprising
a barrel,
a slide in said barrel movable between a retracted position inwardly of said barrel and an outer position adjacent one end of said barrel,
a spear having a shank,
   said barrel having an opening in said one end adapted to receive said shank,
   said shank being engageable with said slide when said shank is so received,
      whereby when said slide moves from said retracted position to said outer position said slide propels said spear,
resilient means for moving said slide from said retracted position to said outer position to so propel said spear,
said resilient means including
   means for pushing said slide
   and means for simultaneously pulling said slide,
means connected to said shank
   and slidable relative thereto from the forward end of said shank to the rearward end of said shank,
and filamentous means interconnecting said barrel and said means connected to said shank for providing a retrieval means for said spear,
said means for pushing said slide including compression spring means in said barrel,
   said compression spring means being compressed when said slide is in said retracted position,
and a pin means movable by said compression spring means to the exterior of said barrel when said spring means is so compressed
   for providing a temporary place of attachment for said filamentous means when said shank is received in said barrel in engagement with said slide in said retracted position,
said pin means being movable inwardly of said barrel when said spring means expands
   for thereby releasing said filamentous means upon propelling of said spear by said slide.

6. A fishing spear gun comprising
a barrel,
a slide in said barrel movable between a retracted position inwardly of said barrel and an outer position adjacent one end of said barrel,
a spear having a shank,
   said barrel having an opening in said one end adapted to receive said shank,
   said shank being engageable with said slide when said shank is so received,
      whereby when said slide moves from said retracted position to said outer position said slide propels said spear,
resilient means for moving said slide from said retracted position to said outer position to so propel said spear,
   said resilient means including compression means compressible upon movement of said slide from said outer position to said retracted position,
   and including extensible tension means for engaging said slide when said slide is in said retracted position,
      said tension means being extensible independently of said compression of said compression means.
means connected to said shank
   including a collar received on said shank and slidable relative thereto from the forward end of said shank to the rearward end of said shank,
      said shank including stop means for limiting the travel of said collar at either end of said shank,
      said collar including outwardly projecting vane means for guiding said spear upon the propulsion thereof,
and filamentous means interconnecting said barrel and said collar means for providing a retrieval means for said spear.

7. A fishing spear gun comprising
a barrel having a bore,
a spear,
   said spear having a point at one end and a shank extending from said point,
barb means
   movable from a first position in juxtaposition with said point
   to a second position extending laterally outwardly therefrom,
pin means transverse of said point for pivotally mounting said barb means adjacent the forward ends thereof for permitting said movement to said second position,
   said barb means including a duality of members complementarily overlying said point when said members are in said first position,
retaining means for normally holding said barb means in said first position,
   said retaining means being movable by the resistance of a target entered by said point for releasing said barb means,
      whereby said barb means is movable to said second position,
   said bore having an open end adapted to receive said shank,
a drive member in said bore engageable by said shank when said shank is so received in said bore,
   said drive member being movable through a stroke from a position inwardly of said open end to a position adjacent said open end for propelling said spear,
and energy means for moving said drive member through said stroke,
   said energy means including means for pushing said drive member through said stroke,
   and including means for pulling said drive member through said stroke,
   said means for pushing said drive member through said stroke including a compression spring in said barrel engaging said drive member,
      said spring being compressed by said drive member upon movement of said drive member from said position adjacent said open end to said position inwardly of said open end,
   said means for pulling said drive member through said stroke including elongatable resilient strands exteriorly of said barrel,
      said strands being engageable with said drive member when said drive member is in said position inwardly of said open end independently of the compression of said compression spring.

8. A fishing spear gun comprising
a barrel,
a slide in said barrel movable between a retracted position inwardly of said barrel and an outer position adjacent one end of said barrel, a spear having a shank,
   said barrel having an opening in said one end adapted to receive said shank,
   said shank being engageable with said slide when said shank is so received,
      whereby when said slide moves from said retracted position to said outer position said slide propels said spear,
resilient means for moving said slide from said retracted position to said outer position to so propel said spear,
   said resilient means including compression means compressible upon movement of said slide from said outer position to said retracted position, and including extensible tension means for engaging said slide when said slide is in said retracted position,
said tension means being extensible independently of said compression of said compression means,
means connected to said shank and slidable relative thereto from the forward end of said shank to the rearward end of said shank, and filamentous means interconnecting said barrel and said means connected to said shank for providing a retrieval means for said spear, said spear including a point at one end of said shank, outwardly expansible barb means at said point, said barb means including at least two members pivotally connected to said spear upon an axis transverse to the longitudinal axis of said shank, said members of said barb means extending rearwardly from said axis, each of said members being substantially complementary to the adjacent portion of said spear, whereby said members are capable of assuming a retracted position closely overlying the periphery of said spear,
a collar on said spear movable longitudinally of said spear a limited distance, said collar having a recess in the forward surface thereof,
said recess normally receiving the distal ends of said members for holding said members in said retracted position,
and resilient means for biasing said members outwardly, whereby upon movement of said collar away from said barb means, said members can expand outwardly for retaining said point of said spear in the body of a fish.

9. A fishing spear gun comprising
a barrel,
a slide in said barrel movable between a retracted position inwardly of said barrel and an outer position adjacent one end of said barrel, a spear having a shank,
said barrel having an opening in said one end adapted to receive said shank,
said shank being engageable with said slide when said shank is so received,
whereby when said slide moves from said retracted position to said outer position said slide propels said spear,
resilient means for moving said slide from said retracted position to said outer position to so propel said spear,
said resilient means including compression means compressible upon movement of said slide from said outer position to said retracted position, and including extensible tension means for engaging said slide when said slide is in said retracted position,
said tension means being extensible independently of said compression of said compression means,
means connected to said shank and slidable relative thereto from the forward end of said shank to the rearward end of said shank, and filamentous means interconnecting said barrel and said means connected to said shank for providing a retrieval means for said spear, said spear including a point assembly at one end of said shank,
said point assembly having an outlet opening therein, a reservoir in said point assembly for retaining a quantity of poison,
a piston means connected to said shank and extending into said reservoir,
said point assembly being movable outwardly relative to said shank and said piston means, and passage means in said point assembly connecting said reservoir to said outlet opening whereby upon entry of said point assembly into the body of a fish movement of said shank relative to said point assembly causes said piston to force said poison from said reservoir through said outlet opening and into said fish.

10. A fishing spear gun comprising
a barrel,
a slide in said barrel movable between a retracted position inwardly of said barrel and an outer position adjacent one end of said barrel, a spear having a shank,
said barrel having an opening in said one end adapted to receive said shank,
said shank being engageable with said slide when said shank is so received,
whereby when said slide moves from said retracted position to said outer position said slide propels said spear,
resilient means for moving said slide from said retracted position to said outer position to so propel said spear,
said resilient means including compression means compressible upon movement of said slide from said outer position to said retracted position, and including extensible tension means for engaging said slide when said slide is in said retracted position,
said tension means being extensible independently of said compression of said compression means,
means connected to said shank and slidable relative thereto from the forward end of said shank to the rearward end of said shank, and filamentous means interconnecting said barrel and said means connected to said shank for providing a retrieval means for said spear, said spear including a point at one end thereof, and a sleeve extending over said shank adjacent said point,
said shank including an abutment for preventing inward longitudinal movement of said sleeve relative to said shank, said sleeve being movable outwardly of said shank, said sleeve including aperture means through the wall thereof,
whereby upon entry of said point and sleeve into the body of a fish said point and said shank are removable from said sleeve for leaving said sleeve within said body for hastening bleeding through said aperture means in said sleeve and maintaining an open wound through said sleeve.

References Cited

UNITED STATES PATENTS

| | | | |
|---|---|---|---|
| 1,241,312 | 9/1917 | Virnig | 273—69 |
| 2,462,248 | 2/1949 | Zbar | 124—26 |
| 2,554,012 | 5/1951 | Cohen | 273—106.5 |
| 2,856,912 | 10/1958 | Erickson | 124—37 X |
| 2,995,373 | 8/1961 | Cox | 273—106.5 |
| 3,014,305 | 12/1961 | Yurchich | 273—106.5 X |
| 3,036,396 | 5/1962 | Swails | 43—6 |
| 3,090,151 | 5/1963 | Stewart et al. | 273—106.5 X |
| 3,246,895 | 4/1966 | Traill | 124—30 |

FOREIGN PATENTS 883,289  3/1943  France.

ANTON O. OECHSLE, *Primary Examiner.*

RICHARD C. PINKHAM, *Examiner.*

W. R. BROWNE, *Assistant Examiner.*